R. H. DAVIS.
FLOW METER FOR GASES.
APPLICATION FILED AUG. 11, 1920.
1,401,887.
Patented Dec. 27, 1921.
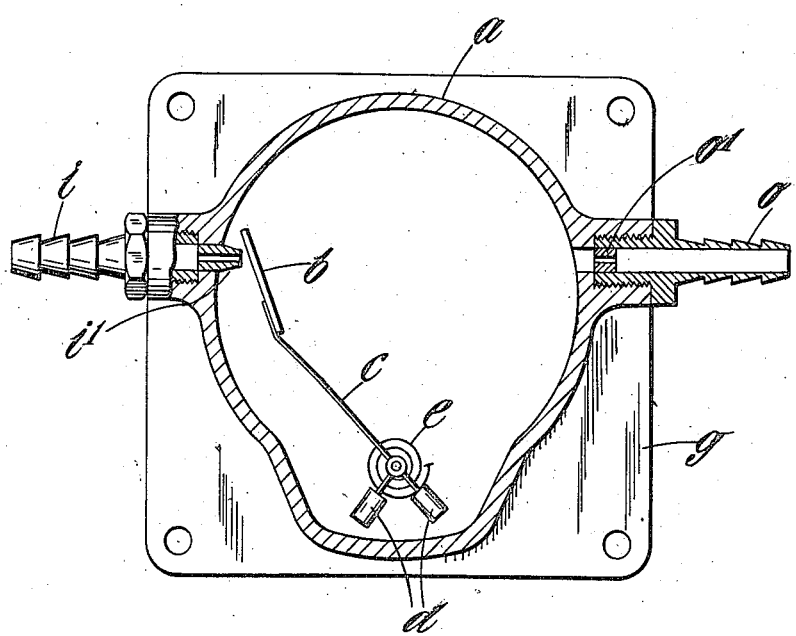

UNITED STATES PATENT OFFICE.

ROBERT H. DAVIS, OF LONDON, ENGLAND.

FLOW-METER FOR GASES.

1,401,887.　　　　Specification of Letters Patent.　　Patented Dec. 27, 1921.

Application filed August 11, 1920. Serial No. 402,886.

*To all whom it may concern:*

Be it known that I, ROBERT HENRY DAVIS, a subject of the King of Great Britain and Ireland, residing at 187 Westminster Bridge Road, London, S. E. 1, in the county of London, England, have invented certain new and useful Improvements in Flow-Meters for Gases, of which the following is a specification.

This invention relates to instruments for measuring the rate of flow of gases of the type in which the gas impinges as a jet upon a plate or vane moving about a pivot against the action of a spring or the like.

The object of the invention is to provide an improved form of instrument of this type in which equal increases in the velocity of the gas cause approximately equal angular movements to be imparted to the plate or vane so as to obtain approximately equal divisions of the scale over which passes a pointer attached to the plate or vane.

In the improved instrument constructed in accordance with this invention a constriction is provided in the outlet pipe of the instrument, near the point where the pipe opens out into the instrument chamber.

The accompanying drawing illustrates in diagrammatic form a section parallel to the indicating dial of an instrument constructed in accordance with the present invention.

The outlet pipe $o$ is provided with a disk $o^1$ formed with a relatively small central orifice through it parallel to the axis of the outlet pipe and the inlet pipe $i$ is provided with a nozzle $i^1$, the bore of which is small compared with the diameter of the pipe. This constriction of the outlet pipe secures greater unformity of angular movement of the vane for equal increase of flow.

The plate or vane $b$ is connected by a light arm $c$ to a spindle which turns about its pivot against the resistance of a hair spring $e$. Balance weights $d$ are provided as a counterbalance for the plate or vane $b$.

The box-like body $a$ of the instrument is preferably provided with a base-plate $g$, and a pointer is designed to be attached to the plate or vane and pass through a slot in a convenient dial plate, though such dial plate and pointer are not illustrated herein, being considered unnecessary to a proper understanding of the structure.

It will of course be understood that the body of the instrument is provided with a gas tight cover holding in position a glass top through which is viewed the position of the pointer relatively to the dial.

I claim:—

1. In an instrument for measuring the rate of flow of gases, an inlet nozzle, a plate against which impinges the jet of gas passing through the nozzle, resilient means for holding the plate in its position of equilibrium in the jet, an outlet pipe and a member placed in the pipe provided with an orifice small relatively to the bore of the pipe.

2. In an instrument for measuring the rate of flow of gases, an inlet pipe, an inlet nozzle arranged therein having an orifice therethrough with diameter small relatively to the diameter of the pipe, a plate against which impinges the jet of gas passing through the nozzle, resilient means for holding the plate in its position of equilibrium in the jet, an outlet pipe and a member placed in the pipe provided with an orifice small relatively to the bore of the pipe.

3. In an instrument for measuring the rate of flow of gases, an inlet pipe, an inlet nozzle arranged therein having an orifice therethrough with diameter small relatively to the diameter of the pipe, a plate against which impinges the jet of gas passing through the nozzle, an arm attached to said plate, a pivoted spindle attached to said spindle, balance weights attached to said spindle, resilient means attached to said spindle for resisting angular movement thereof, an outlet pipe and a member placed in the pipe provided with an orifice small relatively to the bore of the pipe.

In testimony whereof I affix my signature.

ROBERT H. DAVIS.